Jan. 14, 1969  C. W. RHODES  3,421,300
EDGER ATTACHMENT FOR POWER DRIVEN LAWN MOWERS
Filed Dec. 21, 1965
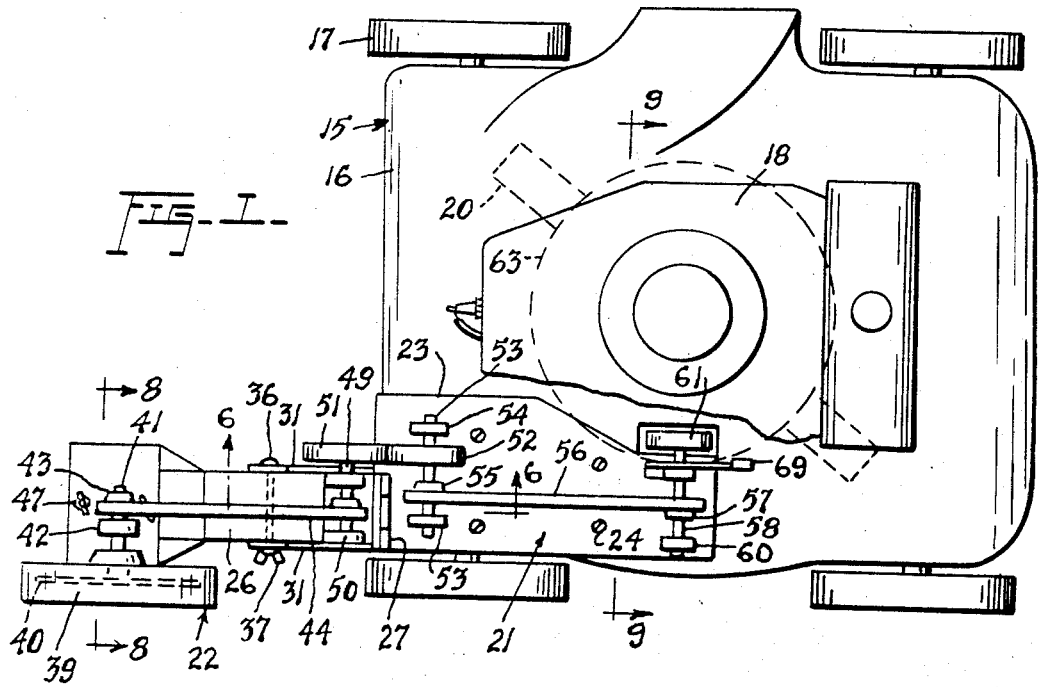
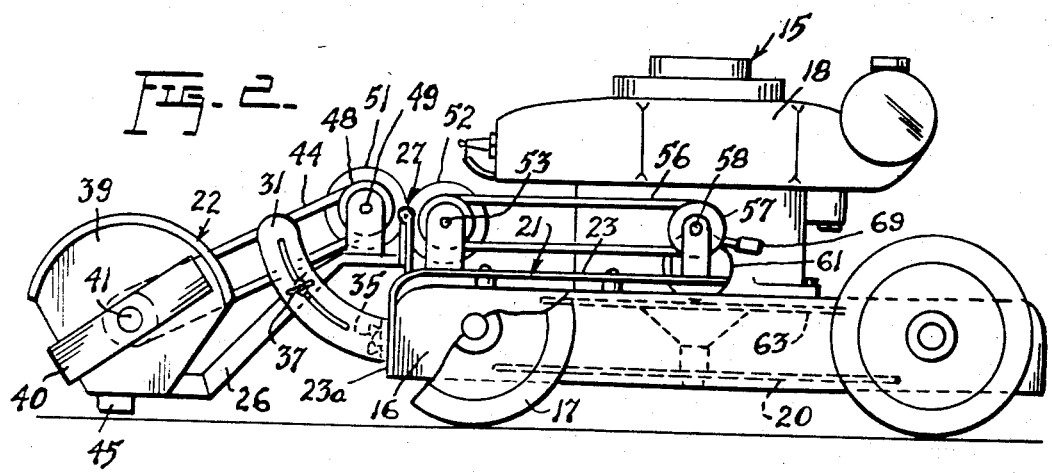
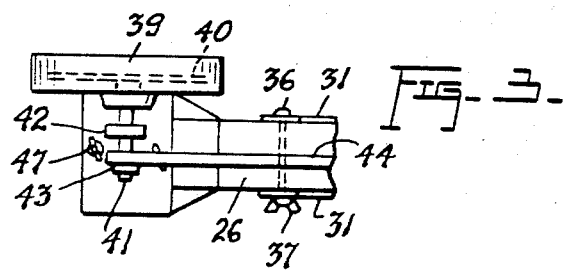
INVENTOR
Charles W. Rhodes
BY Munson H. Lane
ATTORNEY

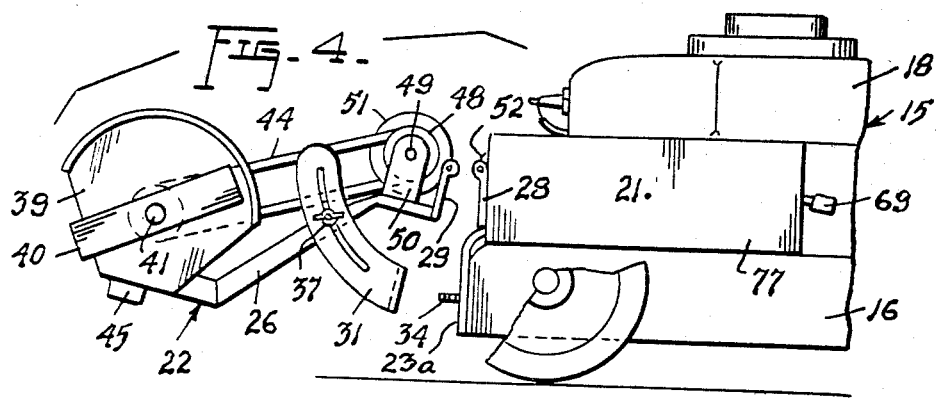
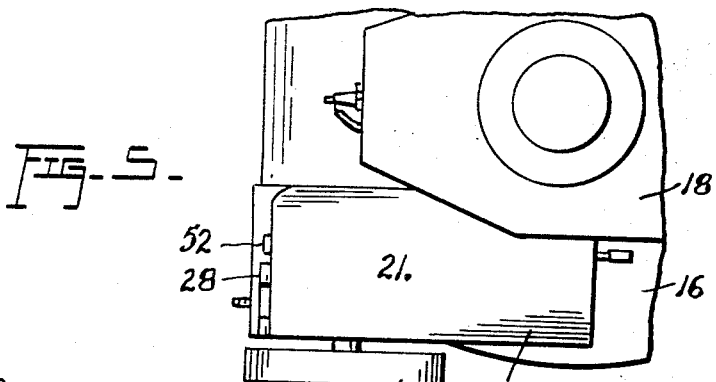
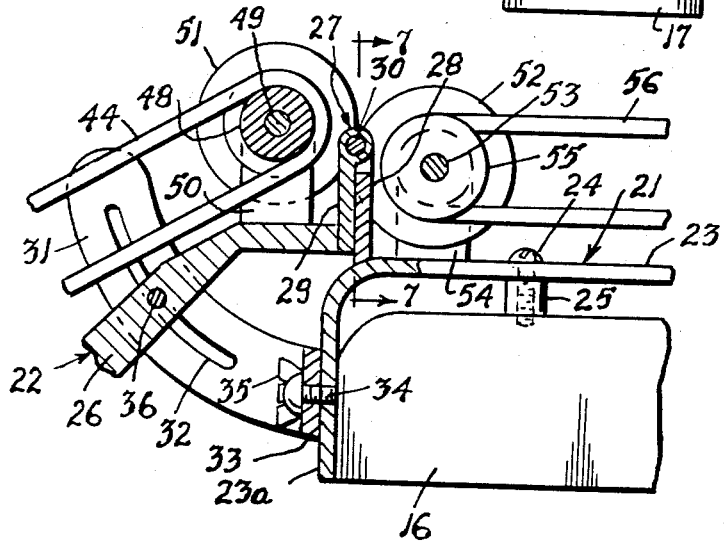

Jan. 14, 1969  C. W. RHODES  3,421,300
EDGER ATTACHMENT FOR POWER DRIVEN LAWN MOWERS
Filed Dec. 21, 1965

INVENTOR
Charles W. Rhodes
BY Munson H. Lane
ATTORNEY

INVENTOR
Charles W. Rhodes
BY Munson H. Lane
ATTORNEY

United States Patent Office 3,421,300
Patented Jan. 14, 1969

3,421,300
EDGER ATTACHMENT FOR POWER DRIVEN LAWN MOWERS
Charles W. Rhodes, 1203 Polk Ave., Victoria, Tex. 77901
Filed Dec. 21, 1965, Ser. No. 515,354
U.S. Cl. 56—25.4
Int. Cl. A01d 35/26
10 Claims

ABSTRACT OF THE DISCLOSURE

The combination of a rotary blade type lawn mower including a housing and a motor driven vertically disposed blade carrying shaft projecting into said housing, and an edger attachment comprising a fixed attachment unit permanently secured to said housing and a readily removable attachment unit separably connected to said fixed unit, said fixed unit including a rotatable drive member driven by said blade carrying shaft, said removable unit including a rotatable driven member in operative engagement with said drive member when the removable unit is applied to the fixed unit and an edge cutter rotatable in a vertical plane by said driven member, said rotatable drive and driven members comprising a pair of complementary frictional rollers carried by said fixed and removable attachments, respectively, said rollers operatively contacting one another when the removable unit is in operative position and being readily separable when the unit carrying the edge cutter is removed from the mower.

---

This invention relates to new and useful improvements in power-driven lawn mowers, and in particular the invention concerns itself with an edger attachment for such mowers, whereby a lawn may be trimmed along sidewalks, driveways, street curbs, and the like.

The principal object of the invention is to provide an edger attachment which is readily applicable to conventional lawn mowers of the rotary blade type and is effectively powered thereby. As such, the edger attachment of the invention comprises two basic components or units, namely, a fixed attachment unit which may be permanently secured to the housing of a conventional lawn mower, and a readily removable attachment unit which is separably connected to the fixed unit. The removable unit carries a rotatable edge cutter which, when the removable unit is applied to the fixed unit, is driven from the usual, vertically disposed cutter blade carrying shaft of the lawn mower. However, when the use of the edger is not required, the removable attachment unit may be quickly and easily separated from the fixed unit and the lawn mower operated in the conventional manner without any interference with the attachment. Conversely, when use of the edger is desired, the removable unit may be readily applied to the fixed unit and is available for instant use without the necessity of making any operating connections.

Another feature of the invention resides in the provision of easily adjustable means for raising or lowering the removable unit relative to the fixed unit, thus correspondingly varying the operating height of the edge cutter.

Still another feature resides in the provision of selective, reversible mounting of the edge cutter on the removable attachment unit so that the edge cutter may operate either at the outside or the inside thereof with respect to the lawnmower, under different conditions of use.

Still another feature involves the provision of clutch means for selectively engaging and disengaging the operative connection between the power mower and the edger.

The edger attachment of the invention is simple in construction, efficient and dependable in operation, capable of installation on rotary blade type power mowers of a conventional character, and adaptable to convenient and economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a top plan view of the edger attachment of the invention applied to a power mower;

FIGURE 2 is a side elevational view thereof;

FIGURE 3 is a fragmentary plan view showing the edge cutter reversed in its position on the removable unit of the attachment;

FIGURE 4 is a fragmentary side elevational view, similar to that shown in FIG. 2 but with the removable attachment unit separated from the fixed unit;

FIGURE 5 is a fragmentary top plan view of the mower and fixed attachment unit as shown in FIG. 4;

FIGURE 6 is an enlarged, fragmentary sectional view, taken substantially in the plane of the line 6—6 in FIG. 1.

Figure 7:
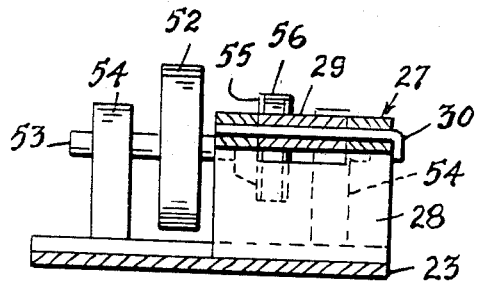
FIGURE 7 is a fragmentary sectional view, taken substantially in the plane of the line 7—7 in FIG. 6.

Referring now to the accompanying drawings in detail, a conventional rotary blade type power lawn mower 15 is illustrated and includes the usual housing 16 supported by traveling wheels 17. The housing carries a prime mover such an an internal combustion engine 18 having a drive shaft 19 which projects downwardly into the housing and is provided with the usual cutter blade 20 rotatable in a horizontal plane, as will be readily understood.

The edger attachments of the invention comprises two main units or components, namely, a fixed attachment unit 21 which is permanently secured to the mower housing 16, and a readily removable attachment unit 22 which is separably connected to the fixed unit 21, as will be hereinafter described.

The fixed attachment unit 21 includes a mounting plate 23 which overlies the top of the housing 16 in spaced relation and is rigidly secured thereto by suitable bolts or screws 24, spacers 25 being interposed between the housing and the mounting plate, as is best shown in FIG. 6. The mounting plate 23 is disposed along one side on top of the housing 16 as shown in FIG. 1, and has a downturned end portion 23a which is juxtaposed to the front wall of the housing.

The removable attachment unit 22 consists of an angulated frame or carrier 26 which is adjustably and separably connected to the fixed unit 21 by a hinge 27. The latter comprises one hinge leaf 28 which is rigidly secured to the mounting plate 23 of the fixed unit 21, a coacting hinge leaf 29 which is rigidly secured to the carrier 26 of the removable unit 22, and a removable hinge pin 30 which separably connects the hinge leaves 28, 29 together, as is best shown in FIG. 6. A pair of arcuate arms 31 provided with arcuate slots 32 straddle an intermediate portion of the carrier 26 and are connected together at one end by a cross-piece 33 (see FIG. 6) which is apertured for positioning on a screw-threaded stud 34 projecting forwardly from the downturned portion 23a of the aforementioned mounting plate 23. A wing nut 35 is provided on the stud 34 to removably retain the cross-piece 33 with the arms 31 in position. The arcuate slots 32 in the arms 31 are concentric with the hinge pin 30 and a bolt 36, equipped with a wing nut 37, extends transversely through the slots 32 in the arms 31 and through the carrier 26. When the nut 37 is loosened, the entire unit 22 may be raised or lowered by swinging about the hinge pin 30 while the bolt 36 rides in the slots 32, so that the effective elevation or height of the unit 22 above the ground may be varied. Of course, the unit 22 may be locked in an adjusted position by tightening the wing nut 37. It will be also noted that the entire unit 22 may be removed from the fixed unit 21 by simply withdrawing the hinge pin 30 and removing the wing nut 35 from the stud 34, so that separation of the unit 22 may be effected as illustrated in FIG. 4. By the same token, the removable unit 22 may be readily installed in position.

Figure 8:
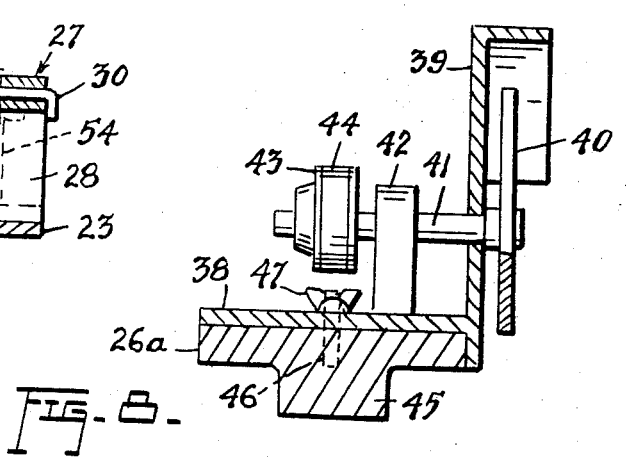
FIGURE 8 is an enlarged, fragmentary sectional view, taken substantially in the plane of the line 8—8 in FIG. 1.

The front end portion of the carrier 26 of the unit 22 provides a platform 26a (see FIG. 8) on which is mounted a support plate 38 carrying a guard 39 for an edging blade 40. The latter is rotatable in a vertical plane and is mounted on a shaft 41 which is rotatably journalled in the guard 39 and in a suitable bearing 42 supported by the plate 38. The shaft 41 also carries a pulley 43 engaged by an endless driving belt 44. The platform portion 26a of the carrier 26 may be provided at the underside thereof with a ground engaging skid 45 and the support plate 38 of the edger is removably mounted on the platform 26a by a pair of screw-threaded studs 46 which project upwardly from the platform and are provided with wing nuts 47, as illustrated in FIG. 8. The arrangement is such that the edger may be mounted on the platform with the cutter blade 40 at the outside of the unit 22 as shown in FIG. 1, or alternatively at the inside of the unit 22 as shown in FIG. 3, the latter arrangement being of convenience when it is desired to operate the edger alongside of street curbing.

The aforementioned driving belt 44 passes around a pulley 48 on a countershaft 49 which is journalled in suitable bearings 50 provided on the carrier 26 adjacent the hinge leaf 29, as is best shown in FIG. 6. The shaft 49 also carries a frictional drive member or roller 51 which cooperates with a similar roller 52, the latter being secured to a shaft 53 journalled in bearings 54 on the plate 23 of the fixed unit 21. It will be apparent that when the removable unit 22 is applied to the fixed unit 21 as already explained, the roller 51 of the removable unit automatically comes into a frictional driving engagement with the roller 52 of the fixed unit, so that rotation of the shaft 53 is transmitted through the rollers and through the belt drive 44 to rotate the edger blade 40. When the unit 22 is removed from the fixed unit 21, the drive connection is automatically broken.

Figure 9:
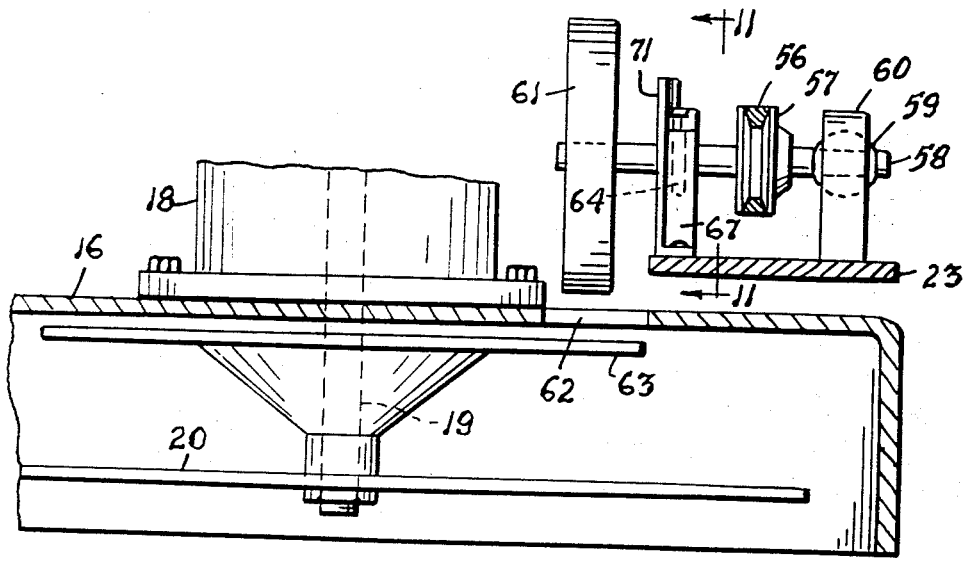
FIGURE 9 is an enlarged, fragmentary sectional view, taken substantially in the plane of the line 9—9 in FIG. 1.
Figure 10:
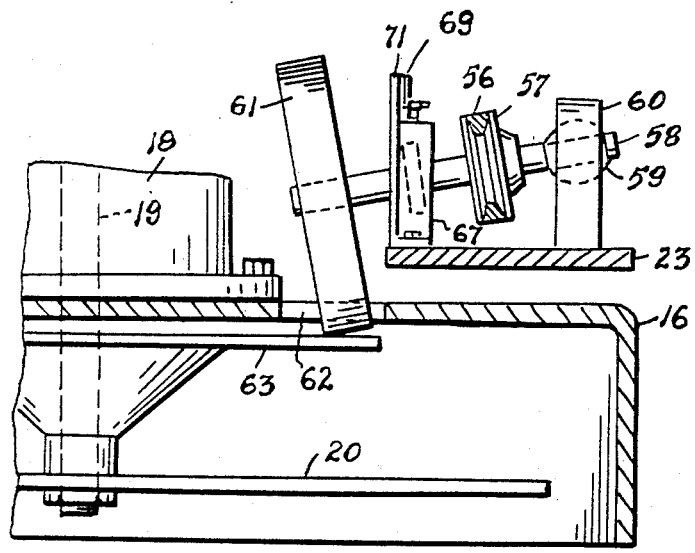
FIGURE 10 is a view, similar to that shown in FIG. 9, but illustrating the clutch means disengaged.

The shaft 53 also carries a pulley 55 connected by an endless belt 56 to a similar pulley 57 on a countershaft 58, the latter being supported at one end thereof in a ball 59 which is rockably seated in a bearing block 60 so that the shaft 58 may be moved in a vertical plane, as for example, between the position shown in FIG. 9 and that shown in FIG. 10. The other end of the shaft 58 carries a drive roller 61 which, when the shaft is lowered as in FIG. 10, projects downwardly through an opening 62 in the top of the housing 16 to frictionally engage the marginal edge portion of a driving disc 63 secured to the motor shaft 19 above the cutter blade 20. In this manner, rotation of the disc 63 by the motor or engine shaft 19 is frictionally transmitted to the roller 61 and then through the belt drive 56, rollers 52, 51 and the belt drive 44 to the edger blade 40, but when the shaft 58 is raised to the position shown in FIG. 9, the roller 61 is disengaged from the disc 63 and the drive to the edger is thus interrupted. It will be understood that when the shaft 58 is lowered, the pulley 57 will be slanted somewhat as shown in FIG. 10, but this deflection will be effectively absorbed by the belt 56 in transmission of the drive to the pulley 55 on the shaft 53.

Figure 11:
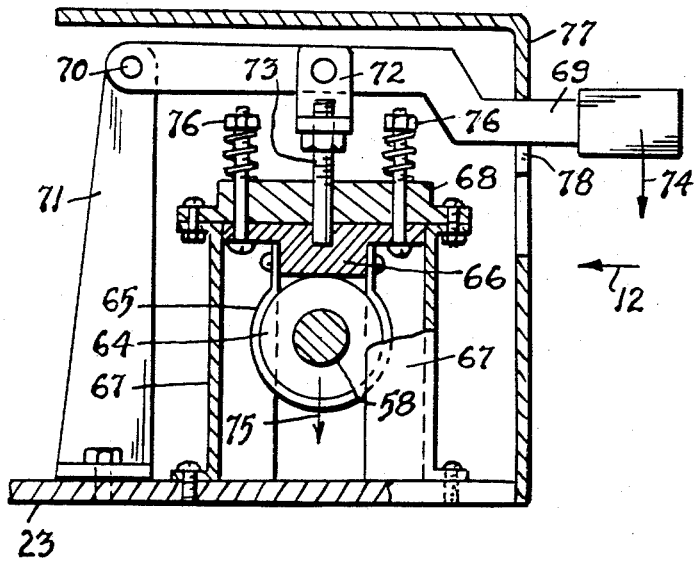
FIGURE 11 is an enlarged, fragmentary sectional view, taken substantially in the plane of the line 11—11 in FIG. 9.

The engagement and disengagement of the roller 61 with the disc 63 accomplishes the function of a clutch in the drive between the power-driven shaft 19 and the edger blade 40, such a clutch also including control means for raising and lowering the shaft 58 as above described. Such control means, shown in detail in FIG. 11, comprise a collar 64 which is rotatably positioned on the shaft 58 and is embraced by a band 65 having its ends secured to a movable block 66. The latter is vertically slidable in a pair of opposing channel-shaped guides 67 secured at their lower ends to the plate 23, the upper ends of the guides being spanned by a cross member 68. A control lever 69 is pivoted as at 70 to an upstanding bracket 71 on the plate 23 and an intermediate portion of the lever 69 has pivoted thereto an angle bracket 72 provided with an adjustable, downwardly extending stud 73. The stud 73 passes slidably through the cross member 68 into a blind socket in the block 66, and it will be apparent that when the lever 69 is depressed as indicated by the arrow 74, the block 66 will move the shaft 58 downwardly as at 75 so as to frictionally engage the roller 61 with the disc 63. Spring-loaded bolts 76 are slidably extended through the cross member 68 to engage the block 66 and bias the same upwardly, thus acting through the band 65 and collar 64 to raise the shaft 58 when the lever 69 is free to move upwardly from its depressed position. It will be understood that the guide channels 67 in which the block 66 is slidable afford sufficient clearance for the collar 64 to permit tilting of the the latter during lowering of the shaft 58, as indicated in FIG. 10.

Figure 12:
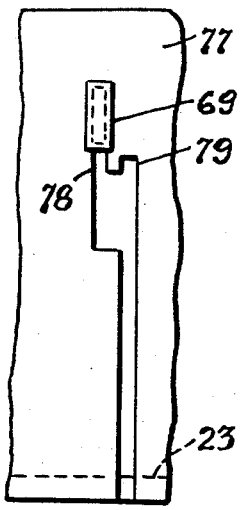
FIGURE 12 is a fragmentary elevational view taken in the direction of the arrow 12 in FIG. 11.

All the operating mechanism of the fixed unit 21 is preferably concealed by a suitable cover 77 which appears in FIGS. 4 and 5 but has been omitted in FIGS. 1 and 2 so that the operating mechanism could be shown in the two last mentioned figures. The control lever 69 projects outwardly through a vertical slot 78 in the cover 77 and, as shown in FIG. 12, the slot 78 is provided with a laterally offset bay 79 in which the lever 69 may be releasably retained when the lever is in its depressed position to transmit drive to the edging cutter. The cover 77 may be held in position on the fixed unit 21 in any suitable manner and, as will be apparent from FIG. 5, the front end of the cover is suitably recessed so that the hinge leaf 28 and the drive roller 52 project therefrom for coaction with the removable unit 22. The provision of the cover 77 not only conceals the fixed unit 21, but also safeguards against possible injury by contact with the drive mechanism of the fixed unit.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to.

What is claimed as new is:

1. The combination of a rotary blade type lawn mower including a housing and a motor-driven vertically disposed blade carrying shaft projecting into said housing, and an edger attachment comprising a fixed attachment unit permanently secured to said housing and a readily removable attachment unit separably connected to said fixed unit, said fixed unit including a rotatable drive member selectively driven by means engagable with said blade carrying shaft, said removable unit including a rotatable driven member in operative engagement with said drive member when the removable unit is applied to the fixed unit, and an edge cutter removably secured with said removable unit and rotatably driven in a vertical plane by means operatively connected with said driven member, said rotatable drive and driven members comprising complementary frictional rollers carried by said fixed and removable attachment units respectively, said rollers operatively contacting one another when the removable unit is in operative position and being readily separable when the unit carrying the edge cutter is removed from the mower.

2. The combination as defined in claim 1 together with readily separable hinge means connecting said removable attachment unit to said fixed unit and permitting raising and lowering adjustment of the removable unit, and means for releasably locking the removable unit in an adjusted position relative to the fixed unit.

3. The device as defined in claim 2 wherein said hinge means include an upright leaf member secured to the fixed unit, a complementary leaf member carried by the removable unit and a hinge pin connecting said leaf members having its axis passing substantially through the zone of contact between the complementary frictional rollers when the removable unit is applied to the fixed unit, said hinge pin being readily removable to permit separation of said removable unit.

4. The combination as defined in claim 1 together with a driving disc rotatable with said blade carrying shaft in said housing, clutch means including a roller engageable with and disengageable from said driving disc, and means operatively connecting said roller to said drive member, said clutch means also including means for moving said roller in and out of engagement with said driving disc.

5. The combination as defined in claim 1 wherein said removable attachment unit includes a support having an outer side and an inner side with respect to said mower housing, and means for mounting said edge cutter on said support selectively at the outer and inner sides thereof.

6. The combination as defined in claim 1 together with a removable cover for said fixed attachment unit on said mower housing.

7. An edger attachment for a rotary blade type lawn mower having a housing and a motor-driven vertically disposed blade carrying shaft, said attachment comprising a fixed attachment unit adapted to be permanently secured to a mower housing and a readily removable attachment unit separably connected to said fixed unit, said fixed unit including a rotatable drive member selectively adapted to be driven by means engageable with the blade carrying shaft of the mower, said removable unit including a rotatable driven member in operative engagement with said drive member when the removable unit is applied to the fixed unit, and an edge cutter removably secured with said removable unit and rotatably driven in a vertical plane by means operatively connected with said driven member, said rotatable drive and driven members comprising complementary frictional rollers carried by said fixed and removable attachment units respectively, said rollers operatively contacting one another when the removable unit is in operative position and being readily separable when the unit carrying the edge cutter is removed from the mower.

8. The device as defined in claim 7 together with readily separable hinge means connecting said removable attachment unit to said fixed unit and permitting raising and lowering adjustment of the removable unit, and means for releasably locking the removable unit in an adjusted position relative to the fixed unit.

9. The device as defined in claim 8 wherein said hinge means include an upright left member secured to the fixed unit, a complementary leaf member carried by the removable unit and a hinge pin connecting said leaf members having its axis passing substantially through the zone of contact between the complementary frictional rollers when the removable unit is applied to the fixed unit, said hinge pin being readily removable to permit separation of said removable unit.

10. The device as defined in claim 7 wherein said removable attachment unit includes a support having an outer side and an inner side with respect to the associated mower housing, and means for mounting said edge cutter on said support selectively at the outer and inner sides thereof.

References Cited

UNITED STATES PATENTS

| | | | |
|---|---|---|---|
| 2,707,858 | 5/1955 | Norton et al. | 56—25.4 |
| 3,053,035 | 9/1962 | Earley | 56—25.4 X |
| 3,192,693 | 7/1965 | Bergeson | 56—25.4 |
| 3,236,037 | 2/1966 | Porterfield | 56—25.4 |
| 3,304,700 | 2/1967 | Barber | 56—25.4 |
| 3,319,406 | 5/1967 | Miles | 56—25.4 |

HUGH R. CHAMBLEE, *Primary Examiner.*